Aug. 14, 1951    A. E. REICHARD    2,563,868
VALVE CONTROL HEAD
Filed Dec. 21, 1945    2 Sheets-Sheet 1

INVENTOR
ARTHUR E. REICHARD
BY
J. William Carson
ATTORNEY

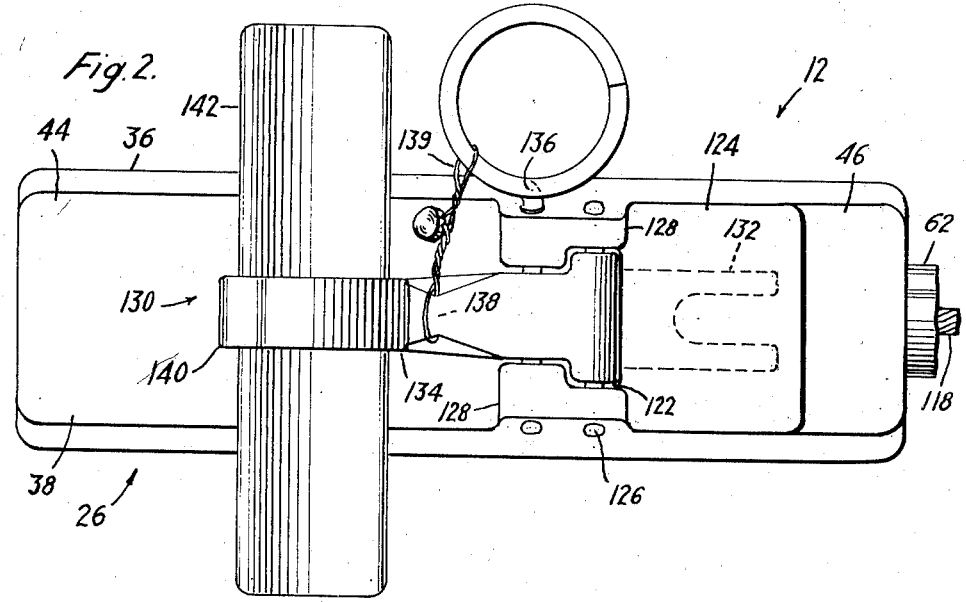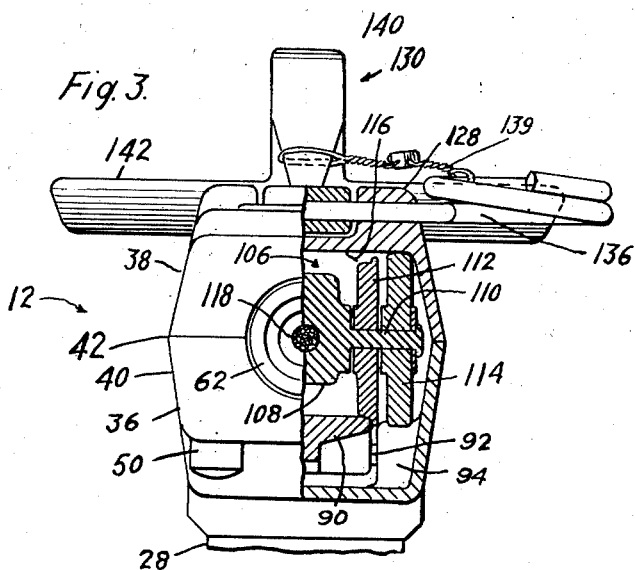

Patented Aug. 14, 1951

2,563,868

UNITED STATES PATENT OFFICE 2,563,868

VALVE CONTROL HEAD

Arthur E. Reichard, North Arlington, N. J., assignor to Specialties Development Corporation, Bloomfield, N. J., a corporation of New Jersey Application December 21, 1945, Serial No. 636,425

12 Claims. (Cl. 169—11)

This invention relates to valve control means, and particularly to means providing individual local control and remote control for one or a plurality of valves.

In extinguishing and preventing fires, and for other purposes, it has been usual to dispense a fluid medium, such as carbon dioxide, under pressure from a storage container or containers, each provided with a valve for controlling the release of the medium through conduit means for conducting the fluid to the point or points of use. It has also been usual to effect the control at the containers, and from remote positions as by rods, cables and the like.

Valves for effecting the above-mentioned control may each comprise a normally closed piston operated main valve, and provided with a unit for operating a pilot valve for controlling the fluid medium to actuate the piston for opening the main valve. The present invention is more specifically directed to control means for such valves.

Accordingly, an object of the invention is to provide novel control means for opening and closing a fluid passage.

Another object is to provide control means adapted for individual local and remote operation and adapted for remote operation in cooperation with other like control means.

A further object is to provide control means which are simple and durable in construction, economical to manufacture, and effective in their operation.

Other and further objects of the invention will be obvious upon an understanding of the illustrative embodiment to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification wherein:

Figure 2 is a top plan view of the structure shown in Figure 1.

Figure 3 is a view partially in end elevation as seen from the right of Figure 1, and partially in section substantially along the line 3—3 of Figure 1.

Figure 1:
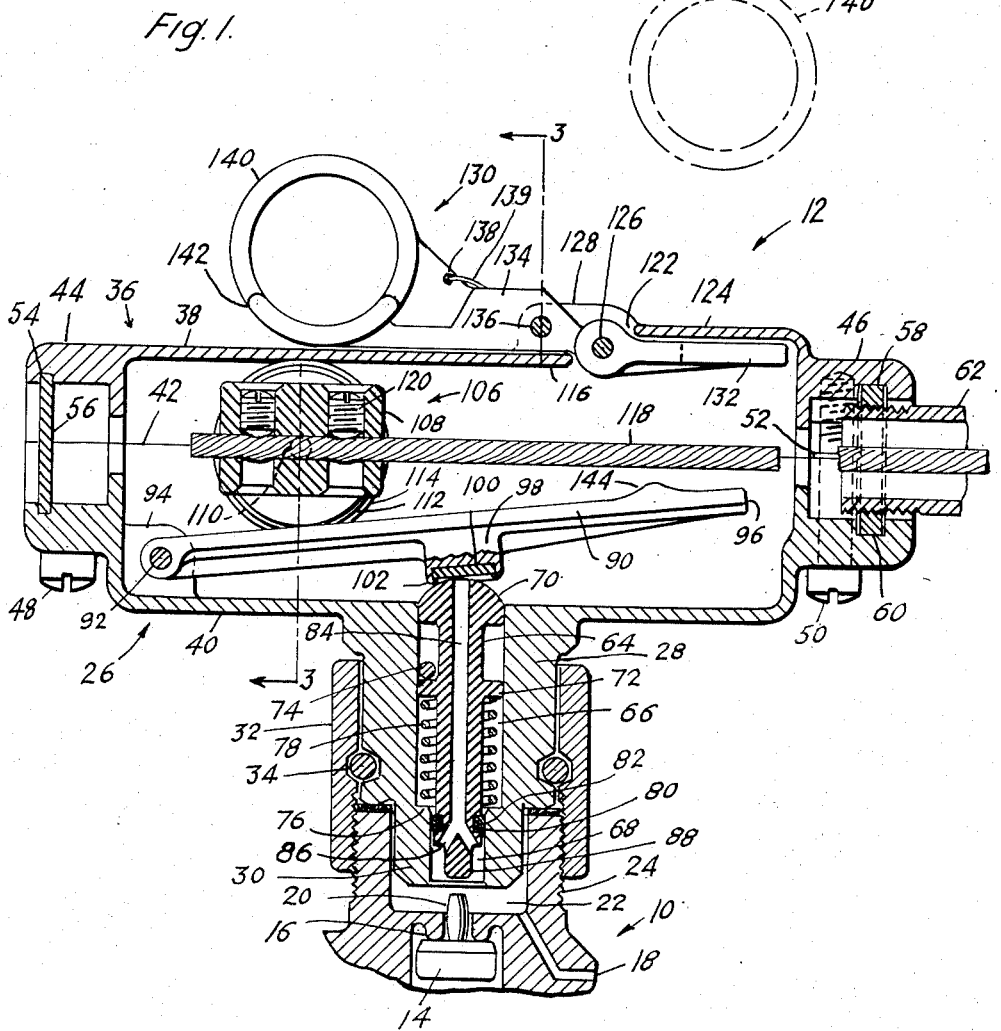
Figure 1 is a sectional view, with certain parts shown in elevation, illustrating a control head constructed in accordance with the invention.

Referring to the drawings, a valve casing 10 is shown in Figure 1 on which a control head 12 of the invention is detachably mounted. The valve casing contains a main valve operated by a piston (not shown herein) which is controlled by a pilot valve member 14 normally held against a valve seat 16 to close a duct 18 through which a pressure medium may be conducted from a container operatively attached to the casing 10, and through the casing 10 to the pressure side of the piston for operating the main valve. A valve of this type is shown in Figure 3 of United States Letters Patent No. 2,383,961. The pilot valve member 14 is provided with a short stem 20 projecting into a compartment 22 formed by a screw-threaded cylindrical portion 24 of the casing 10 for mounting the control head 12.

The control head 12 comprises a housing 26 of substantially T-shape having a leg 28 provided with a constricted end portion 30 extending into the cylindrical mounting portion 24. A coupling nut 32 is threaded to the outer side of the mounting portion 24 and provided with a wire 34 in annular recesses of the nut and the leg 28 providing for adjustment of the housing 26 at any angle about the axis of the portion 24.

The housing 26 has a T-cross portion 36 constructed of separable upper and lower casing members 38 and 40, respectively, of substantially channel or hollow shape, divided along a plane designated by a line 42 and together forming registering open end walls 44 and 46. Screws 48 in the end wall 44 and screws 50 in the end wall 46 are swivel mounted, and held, as by rings 52, against withdrawal from the member 40 when detached from the member 38.

Complemental grooves 54, in the end wall 44 hold a closure disc 56, and similar grooves 58, in the end wall 46 hold a ring nut 60 into which a conduit 62 is threadedly secured.

A plunger 64, in aligned axial bores 66 and 68 of the leg 28 has a head 70 in the portion 36, and a flange 72 stopping the plunger in its upward movement against a pin 74 in the leg 28. A spring 78 for biasing the plunger against the pin 74 extends between the flange and a shoulder 76 at the lower end of the bore 66. The plunger has a groove 80 in the bore 68 for receiving a packing ring 82, and has an axial passage 84 provided with forked branches 86 straddling a reduced end 88 of the plunger for engagement with the stem 20 of the pilot valve member 14.

A lever 90 in the member 40 is pivoted by a pin 92 between side wall pivot supports 94 near the end wall 44, and normally extends diagonally relative to the portion 36 to a free end 96 near the end wall 46. A boss 98, at the underside of the lever 90 over the plunger head 70, has a recess in which a closure member or disc 100 is held, as by a peened edge 102 of the boss 98. The surface of the head 70 engaged by the disc 100 is rounded, so that the disc which in the open position thereof relative to the passage 84, is tilted relative to the passage, moves on the head to closed position substantially normal to the passage.

A wheeled carriage 106 comprises a body block 108 having axially aligned opposite-side trunnions 110 (Figure 3) on which are mounted two pairs of wheels 112 and 114 each having its wheels at opposite sides of the block. The wheels 112 roll on the lever 90, and the wheels 114 roll on the underside of a top wall 116 of the upper member 38.

A cable 118, disposed in an axial bore of the carriage block 108 and secured thereto, as by screws 120, extends through the conduit 62 to remote cable pulling means, or through one or more heads like the head 112 to such pulling means.

The top wall 116 has an aperture 122 between one end thereof and an upwardly offset wall portion 124 constituting a continuation of the wall 116. A pivot pin 126 is disposed in the aperture 122 and mounted in bosses 128 on the top of the upper member 38.

A local control lever 130 pivotally mounted by the pin 126 has a forked inner arm 132 for straddling the cable 118, and outer arm 134 having an aperture for the reception of a locking pin 136 which also extends through apertures in the bosses 128. A hole 138 in the outer arm 134 is adapted to receive a usual seal wire 139.

The outer arm 134 further comprises a ring portion 140 for lifting the lever from above the housing 12, and portions 142 projecting axially of the ring oppositely therefrom to position beyond the sides of the T-cross portion 36 for assisting in such lifting or for pulling or pushing the lever upwardly from either side of the housing 12.

The closure disc 56 is employed where the control head 12 is the only head for, or the remote head of a series of like heads from, the remote control means.

With the disc 56, the carriage 106, the cable 118, the ring nut 60, the conduit 62, and the upper member 38, together with the lever 130 and other parts on the upper member, removed, the cable 118 and the carriage 106 are first mounted in the position shown, and adjusted relative to the lever 90 unhampered by the upper member 38. If the head 12 is to be other than the remote head, the cable 118 will be continued through the open end 44, and the disc 56 not employed. If the head is the remote head, the disc 56 is placed in the groove 54 of the lower member 40, and in either event, the conduit 62 and the ring nut 60 are placed in the groove 58 of the lower member 40. The upper member 38 and the parts carried thereby are next placed in the positions shown, and the member 38 is secured to the lower member 40 by the screws 48 and 50.

In operation by remote control, when the cable 118 is pulled towards the right, as viewed in Figure 1, the carriage is pulled, with its wheels 112 riding on the lever 90 and its wheels 114 rolling on the wall 116, thus depressing the lever 90 about the axis of its pivot pin 92 until the wheels 112 approximately reach a bump 144 on the lever. During this action, the disc member 100 moves from its tilted open position relative to the passage 84, as shown, to a substantially horizontal position in which it is disposed over the passage 84 closing the latter. At the same time the lever moves the plunger 64 downwardly until its reduced end 88 engages the stem 20 to unseat the pilot valve member 14.

In locally operating the head 12, the outer arm 134 is raised, in any of the ways above mentioned, whereby it pivots about the axis of the pin 126 and moves the inner arm 132 downward to straddle the cable 118 and engage the lever 90 to depress it as in the case where the carriage 106 is moved to the right. In such operation, the lever 130 may be moved about ninety-five degrees from its full line position to its broken line position of Figure 1, in which it abuts the wall portion 124 for preventing upward movement of the lever 90 under the pressure of the spring 78 and of the fluid.

With the passage 84 thus closed, fluid medium is released by the pilot valve member 14 to the compartment 22 and from the latter through the duct 18 to the pressure side of the piston which actuates the main valve to release the fluid to be conducted to a fire or other place of use.

After the control head has been operated, it may be desired to stop the flow of fluid medium before its source of supply is exhausted or to effect intermittent discharge thereof. This may be accomplished by returning the lever 130 or carriage 106 to its initial position, whereby the lever 90 is released and pivots upwardly under the influence of the plunger 64 biased upwardly by its spring 78. Such movement of the plunger permits the pilot valve member 14 to engage its seat and shut off the flow of medium to the chamber 22, at the same time the closure disc 100 is so positioned that the plunger passage 84 is open, whereby pressure in back of the main valve operating piston is vented to the atmosphere by way of the duct 18, chamber 22 and passage 84, permitting the main valve to close.

From the foregoing description, it is apparent that a novel control head has been provided wherein the disc 100 and the passage 84 are combined in novel manner with other elements for effecting unseating and seating operation of the pilot valve member 14 in a manner to control the opening and closing of the main valve. The construction and operation of the control head are simple and effective, and have many advantages over former structures.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention.

which, as a matter of language, might be said to fall therebetween.

I claim:

1. In a valve control assembly, the combination of a valve, a valve actuating plunger biased longitudinally away from the valve and having a fluid passage extending axially therein, and a pivoted operating lever carrying closure means for one end of the passage adapted to be actuated to move the plunger against said bias between a passage-open position with the closure means tilted relative to the passage to permit venting of the valve control assembly and a closed position to prevent the escape of fluid through the passage.

2. In a valve control assembly, the combination of a valve, a valve actuating plunger biased longitudinally away from the valve and having a fluid passage extending axially therein, a pivoted operating lever carrying closure means for one end of the passage adapted to be actuated to move the plunger against said bias between a passage-open position with the closure means tilted relative to the passage to permit venting of the valve control assembly and a closed position to prevent the escape of fluid through the passage, and a pivoted member for operating said lever to actuate the plunger.

3. In a valve control assembly having an inlet and an outlet, the combination of a valve for controlling the flow of fluid between the inlet and outlet, an actuating plunger for opening the valve biased longitudinally away from the valve and having a fluid passage therein, closure means for one end of the passage adapted to move the plunger against said bias between a passage-open position with the closure means tilted relative to said passage to permit venting of the valve control assembly and a passage-closed position to prevent the escape of fluid through the passage when the valve is opened, and remote control means including a pull cable for actuating said closure means.

4. In a valve control assembly having an inlet and an outlet, the combination of a valve for controlling the flow of fluid between the inlet and outlet, an actuating plunger for opening the valve having an axial fluid passage, a pivoted operating lever for the plunger carrying closure means for one end of said passage normally in passage-open position with the closure means tilted relative to said passage to permit venting of the valve control assembly and the closure means being responsive to operation of the lever actuating the plunger for movement from the said tilted position to a passage-closed position to prevent the escape of fluid through the passage when the valve is opened, and manually operable means for said lever.

5. In a valve control assembly for a piston operated main discharge valve for controlling the flow of fluid medium under pressure from its source, the combination of a pilot valve operable to direct the fluid to the pressure side of the piston to open the main discharge valve, a plunger for opening the pilot valve, said plunger having a fluid passage therein providing communication between the pressure side of the piston and the atmosphere, tiltable means operable to move the plunger to unseat the pilot valve and to close said passage to prevent the escape of fluid therethrough when the pilot valve is unseated, and means for returning said plunger to a passage-open position, whereby to vent the pressure side of the piston to the atmosphere, and means for operating said tiltable means.

6. In a valve control assembly for a piston operated main discharge valve for controlling the flow of fluid medium under pressure from its source, the combination of a pilot valve operable to direct the fluid to the pressure side of the piston to open the main discharge valve, a plunger for opening the pilot valve, said plunger having a fluid passage therein providing communication between the pressure side of the piston and the atmoshpere, tiltable means operable to move the plunger to unseat the pilot valve and to close said passage to prevent the escape of fluid therethrough when the pilot valve is unseated, and means movable along said tiltable means for operating the latter means.

7. In a valve control assembly for a piston operated main discharge valve for controlling the flow of fluid medium under pressure from its source, the combination of a pilot valve operable to direct the fluid to the pressure side of the piston to open the main discharge valve, a plunger for opening the pilot valve, said plunger having a fluid passage therein providing communication between the pressure side of the piston and the atmosphere, tiltable means operable to move the plunger to unseat the pilot valve and to close said passage to prevent the escape of fluid therethrough when the pilot valve is unseated, and pivotally mounted manually operable means for operating said tiltable means.

8. In a valve control assembly, the combination of a valve casing having a fluid conducting passage provided with an inlet, an outlet and a valve port between said inlet and outlet, a valve member for closing said port, a plunger movable to engage and effect unseating of said valve member having a passage extending therethrough for establishing communication between said outlet and the atmosphere when said plunger is in a position so that unseating of said valve member is not effected, means operable to engage and move said plunger to effect unseating of said valve member having a portion for sealing said plunger passage to prevent communication between said outlet and the atmosphere, and resilient means arranged for normally urging said plunger out of valve member engaging position.

9. A valve control assembly according to claim 8, wherein said means operable to engage and move said plunger include a pivotally mounted element.

10. In a valve control assembly, the combination of a body including a housing and a bore extending to the interior of said housing, a valve member unseating plunger in said bore having one end positioned in said housing, a lever having one end pivotally mounted in said housing at one side of said bore and extending across said plunger to engage the same, and a second lever pivotally mounted on said housing at the other side of said bore, said second lever having an arm positioned in said housing for engaging the end of said first lever opposite the pivoted end and having an arm at the exterior of said housing adapted for manual engagement.

11. In a valve control assembly, the combination of a valve operating plunger, a track pivoted at one end thereof for movement to actuate said plunger, a stationary track opposite said pivoted track and spaced therefrom, carriage means positioned for movement between said tracks to tilt said pivoted track whereby said plunger is actuated, an elongated element connected to said carriage extending between said tracks for moving said carriage, and a manually operable lever pivotally mounted adjacent said stationary track and adjacent the end opposite the pivoted end of said first mentioned track, said lever having means constructed and arranged to be normally positioned with respect to said stationary track so as not to interfere with movement of said carriage between said tracks and to be positioned to engage said pivoted track to tilt the same without being interfered with by said elongated element.

12. A valve control assembly according to claim 11, wherein said lever means are a pair of spaced fingers between which said elongated element extends.

ARTHUR E. REICHARD.

REFERENCES CITED

The following references are of record in the file of this patent:

UNITED STATES PATENTS

| Number | Name | Date |
| --- | --- | --- |
| 312,724 | Jarboe | Feb. 24, 1885 |
| 2,072,577 | Allen | Mar. 2, 1937 |
| 2,243,581 | Smith | May 27, 1941 |
| 2,386,210 | Grant | Oct. 9, 1945 |
| 2,412,613 | Grant, Jr. | Dec. 17, 1946 |